US011480210B2

(12) United States Patent
Shen et al.

(10) Patent No.: US 11,480,210 B2
(45) Date of Patent: Oct. 25, 2022

(54) THERMAL CONCRETE WING NUT ANCHOR

(71) Applicants: Po-Han Shen, Taichung (TW); Arthur Liao, Taichung (TW)

(72) Inventors: Po-Han Shen, Taichung (TW); Arthur Liao, Taichung (TW)

(*) Notice: Subject to any disclaimer, the term of this patent is extended or adjusted under 35 U.S.C. 154(b) by 414 days.

(21) Appl. No.: 16/735,924

(22) Filed: Jan. 7, 2020

(65) Prior Publication Data
US 2020/0240456 A1 Jul. 30, 2020

(30) Foreign Application Priority Data

Jan. 18, 2019 (TW) ................................ 108200911

(51) Int. Cl.
| F16B 37/16 | (2006.01) |
|---|---|
| F16B 25/10 | (2006.01) |
| F16B 39/28 | (2006.01) |
| F16B 43/00 | (2006.01) |
| F16B 25/00 | (2006.01) |

(52) U.S. Cl.
CPC ............ F16B 37/16 (2013.01); F16B 25/103 (2013.01); F16B 39/28 (2013.01); F16B 43/00 (2013.01); F16B 25/0026 (2013.01)

(58) Field of Classification Search
CPC .... F16B 25/0026; F16B 25/103; F16B 37/00; F16B 37/16; F16B 35/06; F16B 39/00; F16B 39/10; F16B 39/24; F16B 39/28; F16B 43/00
USPC .................................. 411/166, 427, 432, 435
See application file for complete search history.

(56) References Cited

U.S. PATENT DOCUMENTS

| 244,379 | A | * | 7/1881 | Coulter et al. | .......... F16B 37/16 411/918 |
|---|---|---|---|---|---|
| 1,103,847 | A | * | 7/1914 | Schneider | ............... F16B 39/02 411/255 |
| 1,263,086 | A | * | 4/1918 | McLaughlin | .......... F16B 33/002 81/15.8 |
| 2,250,787 | A | * | 7/1941 | Anderson | ........... F16B 37/0892 49/7 |
| 2,335,769 | A | * | 11/1943 | Kissling | .................. F16B 37/02 470/23 |
| 2,576,643 | A | * | 11/1951 | Roerig | ................ F16B 37/0821 411/435 |
| 3,006,231 | A | * | 10/1961 | Kahn | .................... F16B 5/0291 470/23 |
| 8,596,010 | B2 | * | 12/2013 | Hohmann, Jr. | ........ E04B 1/4178 52/561 |
| 8,661,766 | B2 | * | 3/2014 | Hohmann, Jr. | ........ E04B 1/4178 52/705 |

(Continued)

*Primary Examiner* — Roberta S Delisle
(74) *Attorney, Agent, or Firm* — Alan D. Kamrath; Karin L. Williams; Mayer & Williams PC

(57) ABSTRACT

A thermal concrete wing nut anchor includes a screw having an external thread, and a wing nut mounted on the screw. The screw has a first end provided with an enlarged stop flange, and a second end provided with a drilling tip. The stop flange is provided with a driving head. The wing nut is made of a metal sheet plate which is formed integrally by pressing. The wing nut has a middle provided with a first ear and at least one second ear. The wing nut has an internal thread extending through the first ear and the at least one second ear. The external thread of the screw is screwed through the internal thread of the wing nut.

18 Claims, 9 Drawing Sheets

(56) References Cited

U.S. PATENT DOCUMENTS 9,260,857 B2 *  2/2016  Hohmann, Jr. ....... E04B 1/7616

* cited by examiner

THERMAL CONCRETE WING NUT ANCHOR

BACKGROUND OF THE INVENTION

1. Field of the Invention

The present invention relates to a wing nut screw or bolt and, more particularly, to a thermal concrete wing nut anchor.

2. Description of the Related Art

A conventional thermal concrete wing nut anchor in accordance with the prior art shown in FIGS. 1 and 2 comprises a screw 60, and a wing nut assembly 70 mounted on the screw 60. The screw 60 has a first end provided with a hexagonal mounting portion 65, an enlarged stop flange 62, and a hexagonal driving head 63. The screw 60 has a second end provided with an external thread 61 and a drilling tip 64. The driving head 63 is driven and rotated by a socket (not shown) of an electric tool (not shown), and the drilling tip 64 is used to drill an article or object (not shown). The wing nut assembly 70 includes two metal sheet plates. Each of the two metal sheet plates is made by pressing to form an ear 71, a mounting recess 72, and a substantially L-shaped positioning groove 73. The mounting recesses 72 of the two metal sheet plates form a hexagonal hole secured on the mounting portion 65 of the screw 60. The positioning groove 73 of one of the two metal sheet plates is positioned on an end of the other one of the two metal sheet plates, such that the two metal sheet plates are connected to form the wing nut assembly 70. The two metal sheet plates are combined together by soldering. However, each of the two metal sheet plates is initially worked by pressing to form the ear 71, the mounting recess 72, and the positioning groove 73, while the two metal sheet plates are then combined together by soldering to form the wing nut assembly 70, such that the conventional thermal concrete wing nut anchor is not made easily and conveniently, thereby increasing the cost of fabrication, and thereby complicating the working process. In addition, the stop flange 62 and the driving head 63 protrude from the wing nut assembly 70, such that the conventional thermal concrete wing nut anchor has an uneven appearance.

BRIEF SUMMARY OF THE INVENTION

The primary objective of the present invention is to provide a thermal concrete wing nut anchor with an integral structure.

In accordance with the present invention, there is provided a wing nut anchor comprising a screw, and a wing nut mounted on the screw. The screw has an external thread. The screw has a first end provided with an enlarged stop flange, and a second end provided with a drilling tip. The stop flange is provided with a driving head. The wing nut is made of a metal sheet plate which is formed integrally by pressing. The wing nut has a middle provided with a first ear and at least one second ear. The first ear and the at least one second ear are located at two opposite sides of the wing nut and protrude from the wing nut in two opposite directions. The wing nut has an internal thread. The internal thread of the wing nut extends through the first ear and the at least one second ear. The external thread of the screw is screwed through the internal thread of the wing nut.

According to the primary advantage of the present invention, the wing nut is made of a metal sheet plate which is formed integrally by pressing, thereby saving the cost of fabrication, and thereby simplifying the working process.

According to another advantage of the present invention, the stop flange and the driving head of the screw are received in the recessed portion of the wing nut and will not protrude from the wing nut when the external thread of the screw is screwed into the article, such that the wing nut anchor has a flat and smooth appearance.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
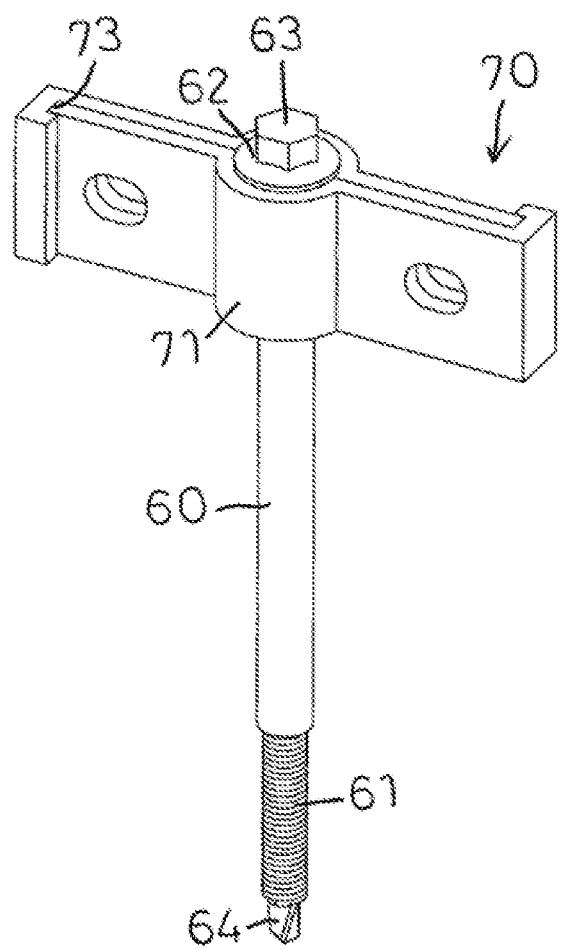
FIG. 1 is a perspective view of a conventional thermal concrete wing nut anchor in accordance with the prior art.
Figure 2:
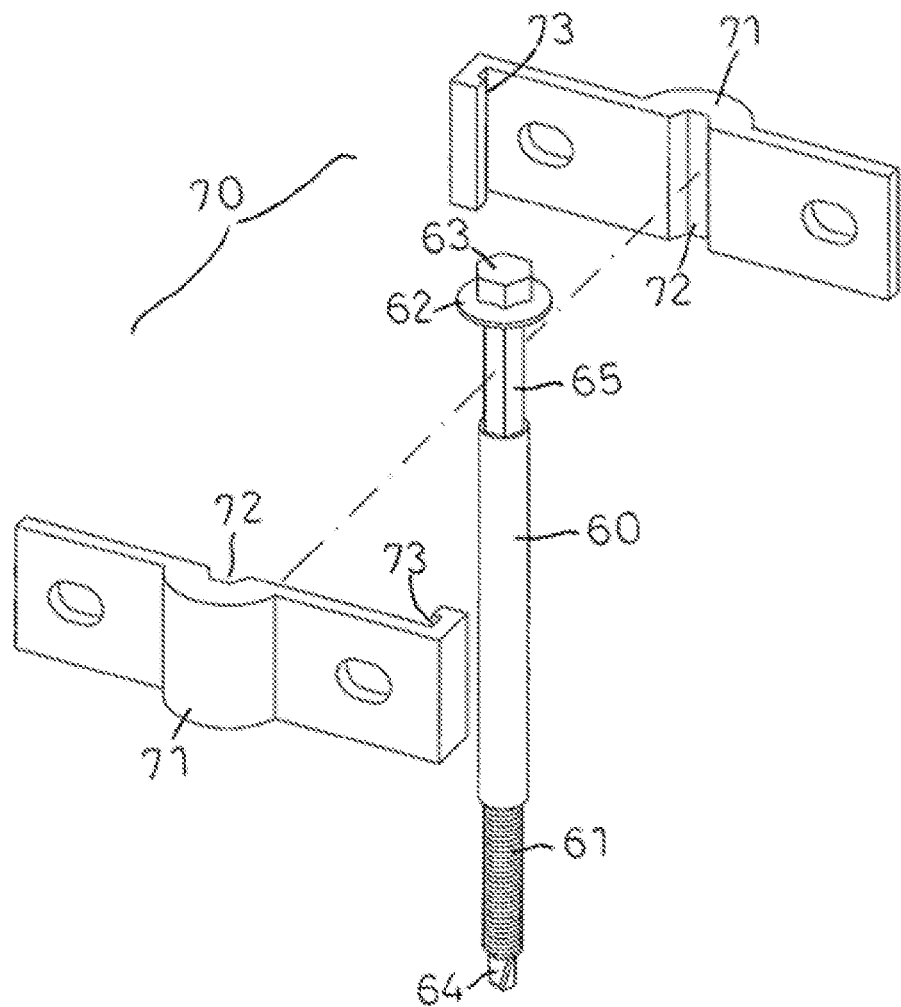
FIG. 2 is an exploded perspective view of the conventional thermal concrete wing nut anchor in accordance with the prior art.
Figure 3:
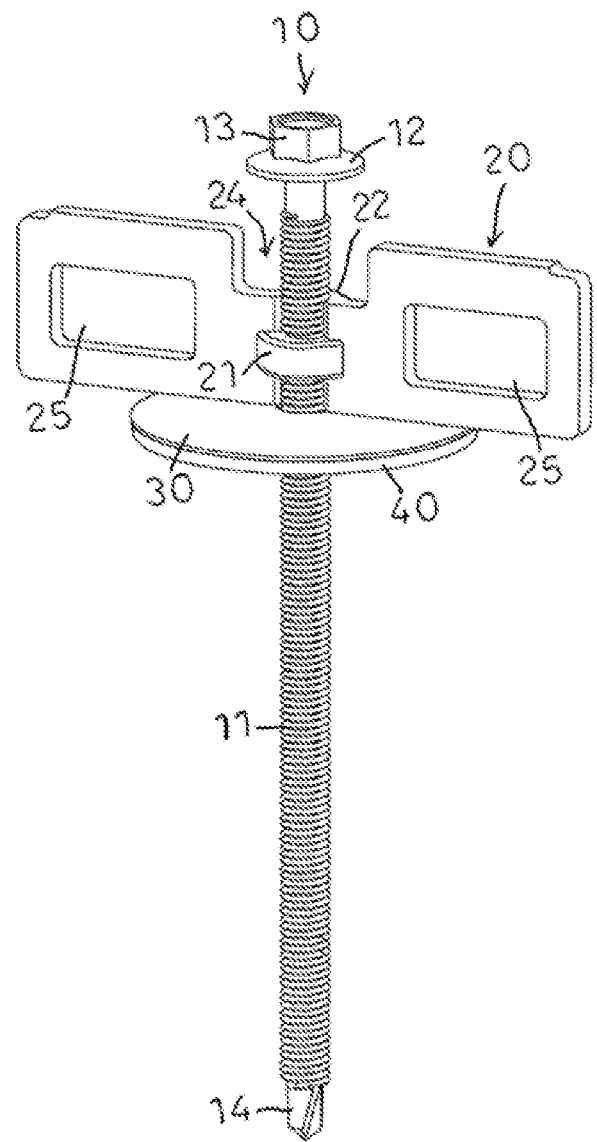
FIG. 3 is a perspective view of a thermal concrete wing nut anchor in accordance with the preferred embodiment of the present invention.
Figure 4:
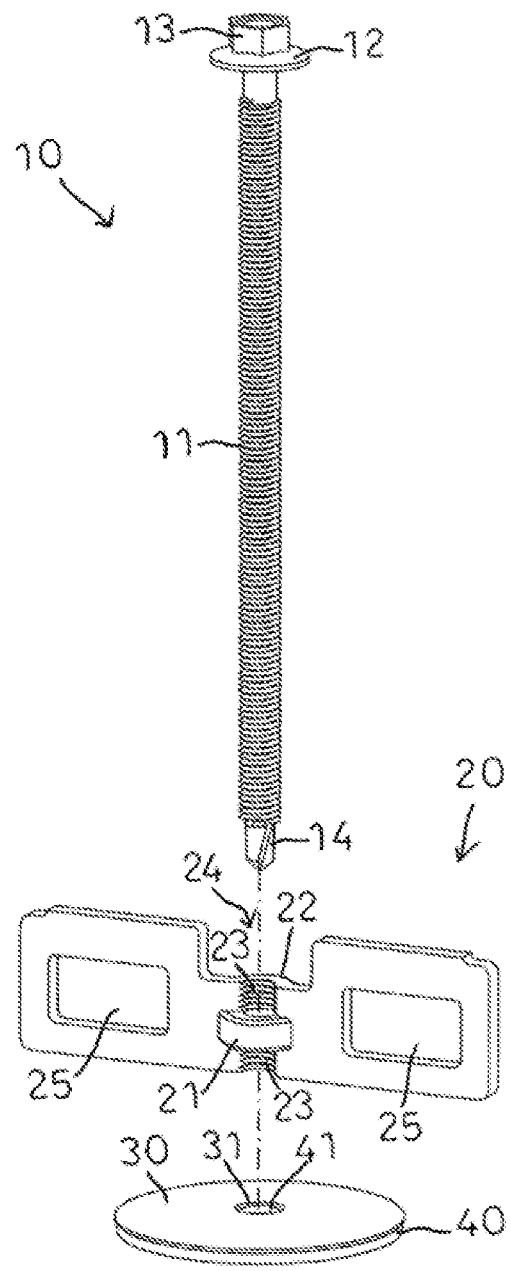
FIG. 4 is an exploded perspective view of the thermal concrete wing nut anchor in accordance with the preferred embodiment of the present invention.
Figure 5:
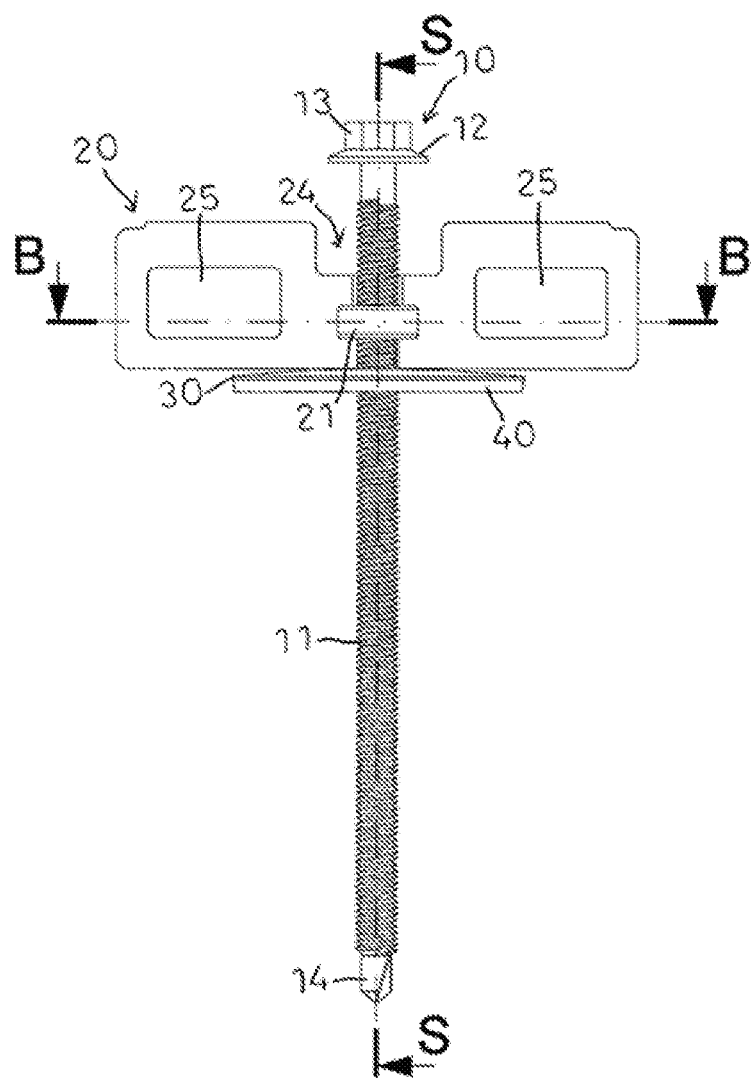
FIG. 5 is a front view of the thermal concrete wing nut anchor in accordance with the preferred embodiment of the present invention.
Figure 6:
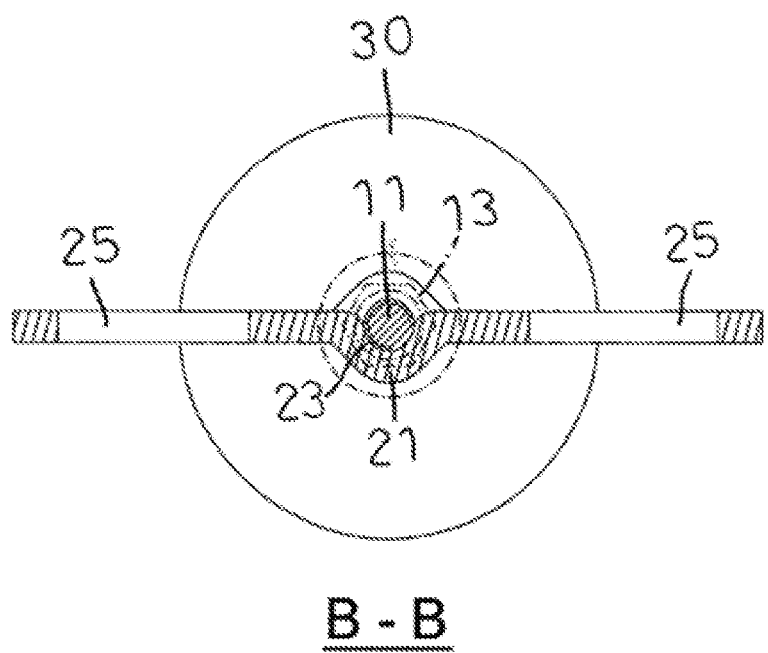
FIG. 6 is a cross-sectional view of the thermal concrete wing nut anchor taken along line B-B as shown in FIG. 5.
Figure 7:
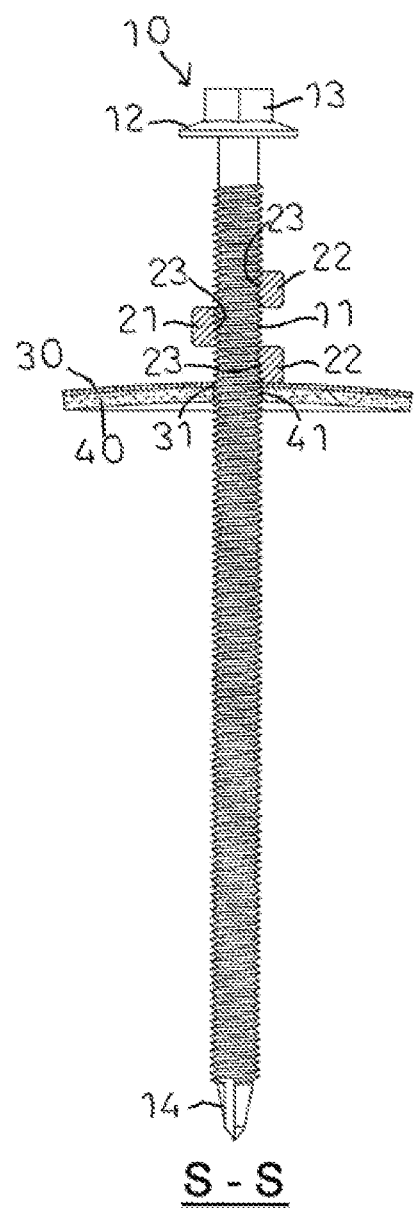
FIG. 7 is a cross-sectional view of the thermal concrete wing nut anchor taken along line S-S as shown in FIG. 5.

Referring to the drawings and initially to FIGS. 3-7, a thermal concrete wing nut anchor in accordance with the preferred embodiment of the present invention comprises a screw 10, and a wing nut 20 mounted on the screw 10.

The screw 10 is a thermal concrete screw and has an external thread 11. The screw 10 has a first end provided with an enlarged stop flange 12, and a second end provided with a drilling tip 14. The stop flange 12 is provided with a driving head 13. The driving head 13 is driven and rotated by an electric tool (not shown), and the drilling tip 14 is used to drill an article or object (not shown).

The wing nut 20 is made of a metal sheet plate which is formed integrally by pressing (stamping or punching). The wing nut 20 has a middle provided with a first ear 21 and at least one second ear 22. The first ear 21 and the at least one second ear 22 are located at two opposite sides of the wing nut 20 and protrude from the wing nut 20 in two opposite directions. The wing nut 20 has an internal thread 23. The internal thread 23 of the wing nut 20 extends through the first ear 21 and the at least one second ear 22. The external thread 11 of the screw 10 is screwed through the internal thread 23 of the wing nut 20.

In the preferred embodiment of the present invention, the driving head 13 of the screw 10 has a hexagonal shape.

In the preferred embodiment of the present invention, the thermal concrete wing nut anchor further comprises a hard washer 30 and a resilient washer 40. The hard washer 30 and the resilient washer 40 are mounted on the external thread 11 of the screw 10 and are located under the wing nut 20. The hard washer 30 is a circular sheet plate made of metal material and has a center provided with a through hole 31 allowing passage of the external thread 11 of the screw 10. The resilient washer 40 is a circular sheet plate made of plastic or rubber material and has a center provided with a through hole 41 allowing passage of the external thread 11 of the screw 10.

In the preferred embodiment of the present invention, the hard washer 30 and the resilient washer 40 are combined together.

In the preferred embodiment of the present invention, the wing nut 20 has two hollow portions 25 formed on two opposite ends thereof. Each of the two hollow portions 25 has a rectangular shape.

In the preferred embodiment of the present invention, the middle of the wing nut 20 is provided with a recessed portion 24 corresponding to the stop flange 12 of the screw 10. When the screw 10 is locked onto the wing nut 20, the stop flange 12 of the screw 10 rests on a bottom of the recessed portion 24 of the wing nut 20. The stop flange 12 and the driving head 13 of the screw 10 are received and hidden in the recessed portion 24 of the wing nut 20 when the stop flange 12 of the screw 10 rests on the bottom of the recessed portion 24 of the wing nut 20. Thus, the stop flange 12 and the driving head 13 of the screw 10 will not protrude from the wing nut 20, to keep the flatness and smoothness of the wing nut anchor.

In the preferred embodiment of the present invention, the first ear 21 has a semicircular shape, and the at least one second ear 22 has a semicircular shape.

In the preferred embodiment of the present invention, the wing nut 20 is formed with two second ears 22.

Figure 8:
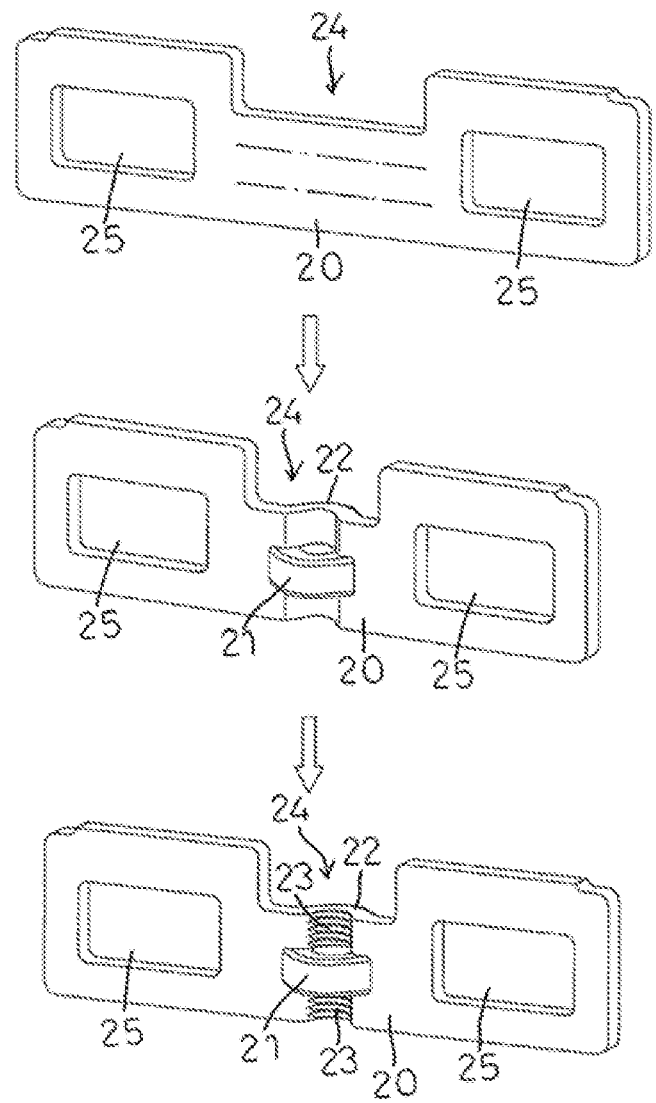
FIG. 8 is a schematic view showing fabrication of a wing nut of the thermal concrete wing nut anchor in accordance with the preferred embodiment of the present invention.

Referring to FIG. 8, the wing nut 20 is made of a metal sheet plate which is formed integrally by pressing (stamping or punching), so as to form the first ear 21, the at least one second ear 22, the internal thread 23, the recessed portion 24, and the two hollow portions 25.

Figure 9:
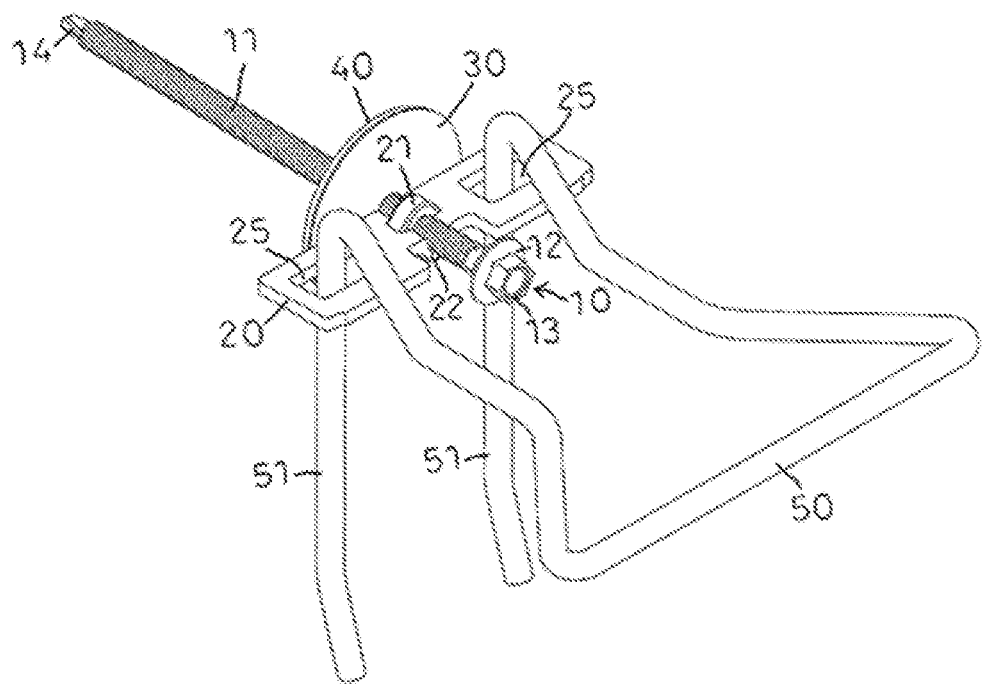
FIG. 9 is a schematic operational view of the thermal concrete wing nut anchor as shown in FIG. 1 in use.

In operation, referring to FIG. 9 with reference to FIGS. 3-7, a mark is indicated on the surface of the article (not shown). Then, the center of the internal thread 23 of the wing nut 20 aligns with the mark of the article. Then, the external thread 11 of the screw 10 is screwed through the internal thread 23 of the wing nut 20. Then, a socket (not shown) of the electric tool (not shown) is fitted onto the driving head 13 of the screw 10. In such a manner, the driving head 13 of the screw 10 is driven and rotated by the electric tool, and the drilling tip 14 is rotated and drilled into the article. Thus, the screw 10 is straight screwed into the article by provision of the wing nut 20. Finally, the stop flange 12 of the screw 10 is stopped by the recessed portion 24 of the wing nut 20. A hanger 50 has two legs 51 inserted into the two hollow portions 25 of the wing nut 20 respectively. Thus, the hanger 50 is attached to the article by the wing nut anchor.

Accordingly, the wing nut 20 is made of a metal sheet plate which is formed integrally by pressing, thereby saving the cost of fabrication, and thereby simplifying the working process. In addition, the stop flange 12 and the driving head 13 of the screw 10 are received in the recessed portion 24 of the wing nut 20 and will not protrude from the wing nut 20 when the external thread 11 of the screw 10 is screwed into the article, such that the wing nut anchor has a flat and smooth appearance.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A wing nut anchor comprising:
   a screw; and
   a wing nut mounted on the screw;
   wherein:
   the screw has an external thread:
   the screw has a first end provided with an enlarged stop flange, and a second end provided with a drilling tip;
   the stop flange is provided with a driving head;
   the wing nut is made of a metal sheet plate which is formed integrally by pressing;
   the wing nut has a middle provided with a first ear and at least one second ear;
   the first ear and the at least one second ear are located at two opposite sides of the wing nut and protrude from the wing nut in two opposite directions;
   the first ear and the at least one second ear have different height:
   the wing nut has an internal thread;
   the internal thread of the wing nut extends through the first ear and the at least one second ear; and
   the external thread of the screw is screwed through the internal thread of the wing nut;
   wherein:
   the middle of the wing nut is provided with a recessed portion corresponding to the stop flange of the screw and arranged above the at least one second ear; and
   when the screw is locked onto the wing nut, the stop flange of the screw rests on a bottom of the recessed portion of the wing nut.

2. The wing nut anchor of claim 1, wherein the driving head of the screw has a hexagonal shape.

3. The wing nut anchor of claim 1, further comprising:
   a hard washer and a resilient washer;
   wherein:
   the hard washer and the resilient washer are located under the wing nut;
   the drilling tip of the screw in turn extends through the at least one second ear the first ear, the hard washer, and the resilient washer;
   the hard washer is a circular sheet plate made of metal material and has a center provided with a through hole allowing passage of the external thread of the screw; and
   the resilient washer is a circular sheet plate made of plastic or rubber material and has a center provided with a through hole allowing passage of the external thread of the screw.

4. The wing nut anchor of claim 1, wherein:
   the wing nut has two hollow portions formed on two opposite ends thereof; and
   each of the two hollow portions has a rectangular shape.

5. The wing nut anchor of claim 1, wherein the stop flange and the driving head of the screw are fully received and hidden in the recessed portion of the wing nut when the stop flange of the screw rests on the bottom of the recessed portion of the wing nut.

6. The wing nut anchor of claim 1, wherein the stop flange and the driving head of the screw are movable freely in the recessed portion of the wing nut.

7. The wing nut anchor of claim 1, wherein the first ear misaligns with the at least one second ear.

8. The wing nut anchor of claim 1, wherein the first ear disconnects the at least one second ear.

9. The wing nut anchor of claim 1, wherein the first ear is spaced from the at least one second ear.

10. The wing nut anchor of claim 1, wherein the internal thread of the first ear misaligns with the internal thread of the at least one second ear.

11. The wing nut anchor of claim 1, wherein the internal thread of the first ear is exposed from the first ear.

12. The wing nut anchor of claim 1, wherein the internal thread of the at least one second ear is exposed from the at least one second ear.

13. The wing nut anchor of claim 1, wherein the wing nut is formed with two second ears spaced from each other.

14. The wing nut anchor of claim 13, wherein the first ear is arranged between the two second ears.

15. The wing nut anchor of claim 13, wherein one of the two second ears has a height more than that of the first ear, and the other one of the two second ears has a height less than that of the first ear.

16. The wing nut anchor of claim 1, wherein the stop flange of the screw is secured with the driving head.

17. The wing nut anchor of claim 1, wherein the stop flange is secured with the screw and is moved with the screw when the screw is rotated.

18. The wing nut anchor of claim 1, wherein the internal thread of the wing nut in turn extends through the at least one second ear and the first ear.

* * * * *